April 6, 1943. A. W. MILLS ET AL 2,315,723
RECORD CONTROLLED MACHINE
Filed Oct. 13, 1941 6 Sheets-Sheet 5
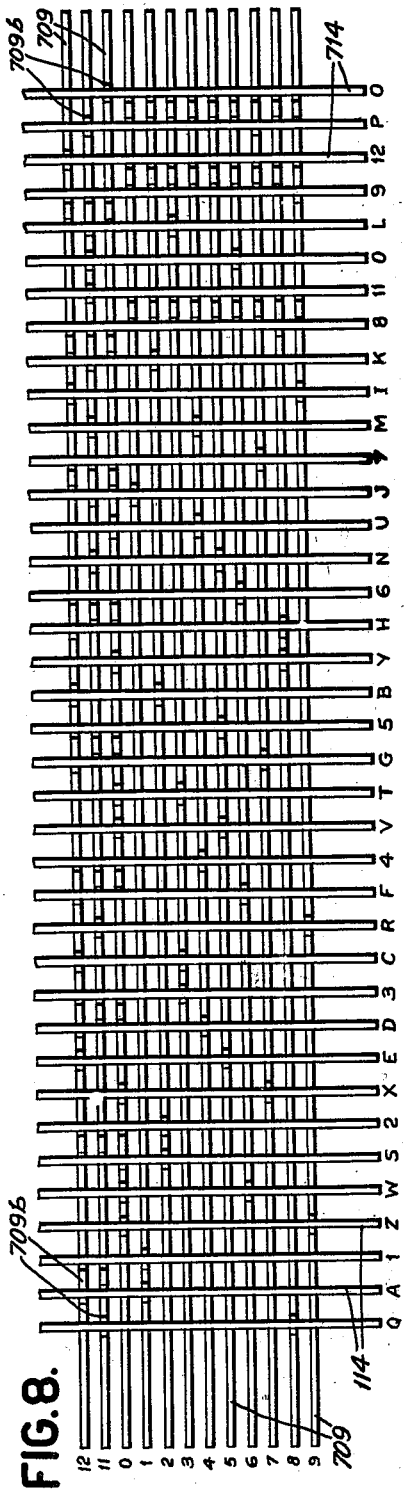
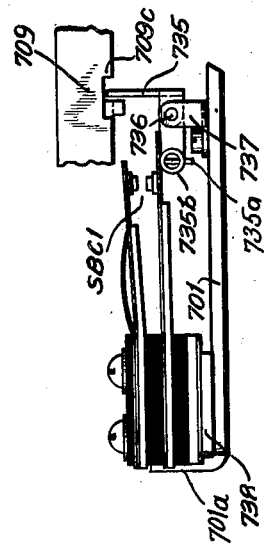
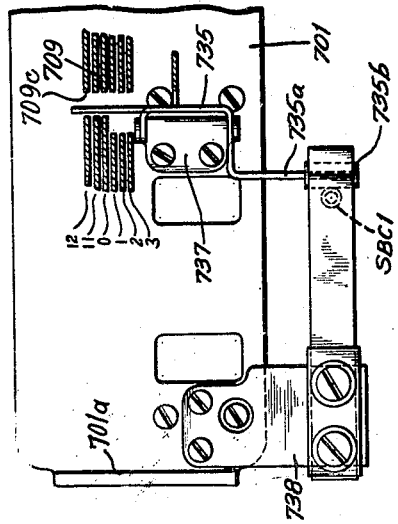
INVENTORS
BY
ATTORNEY Patented Apr. 6, 1943

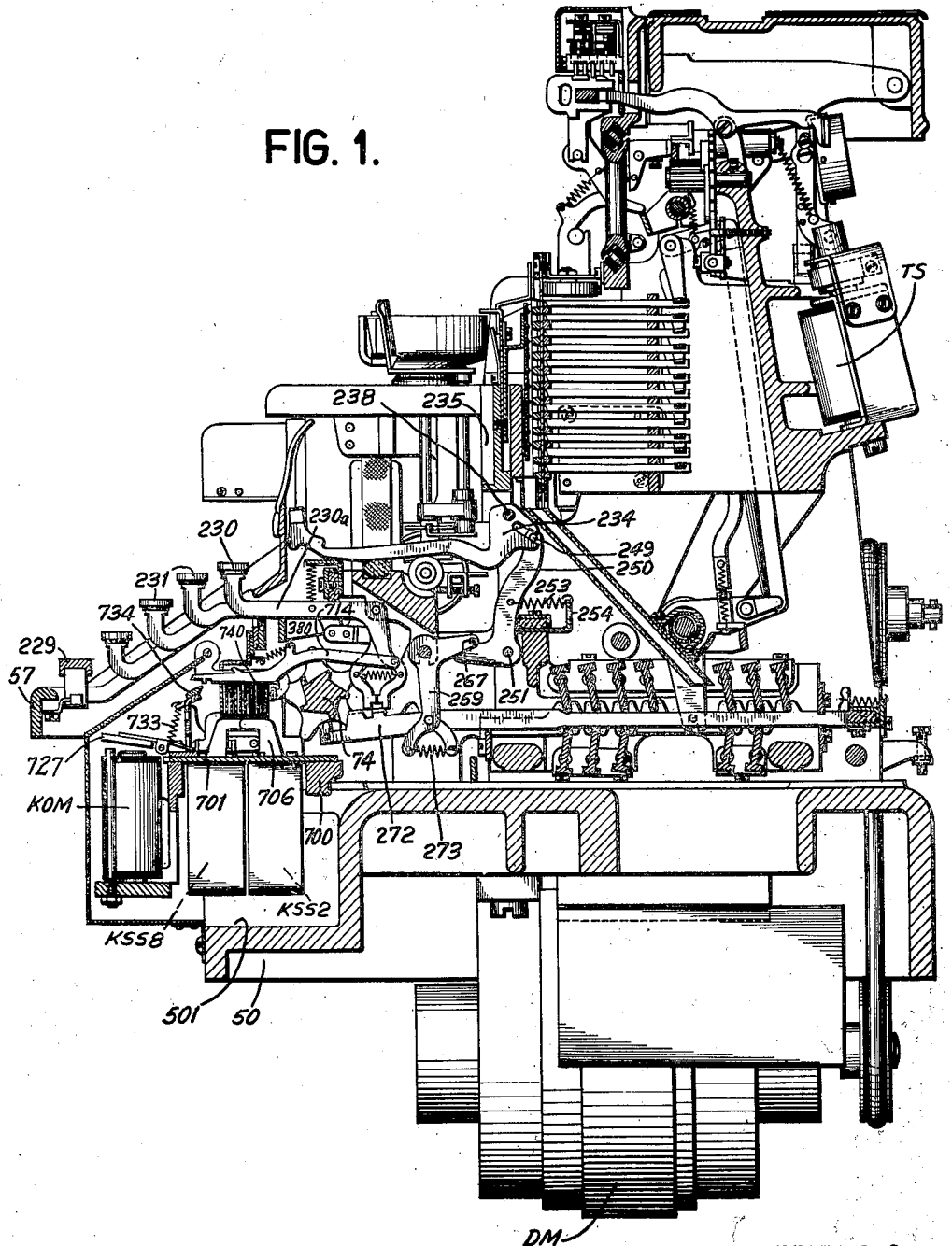

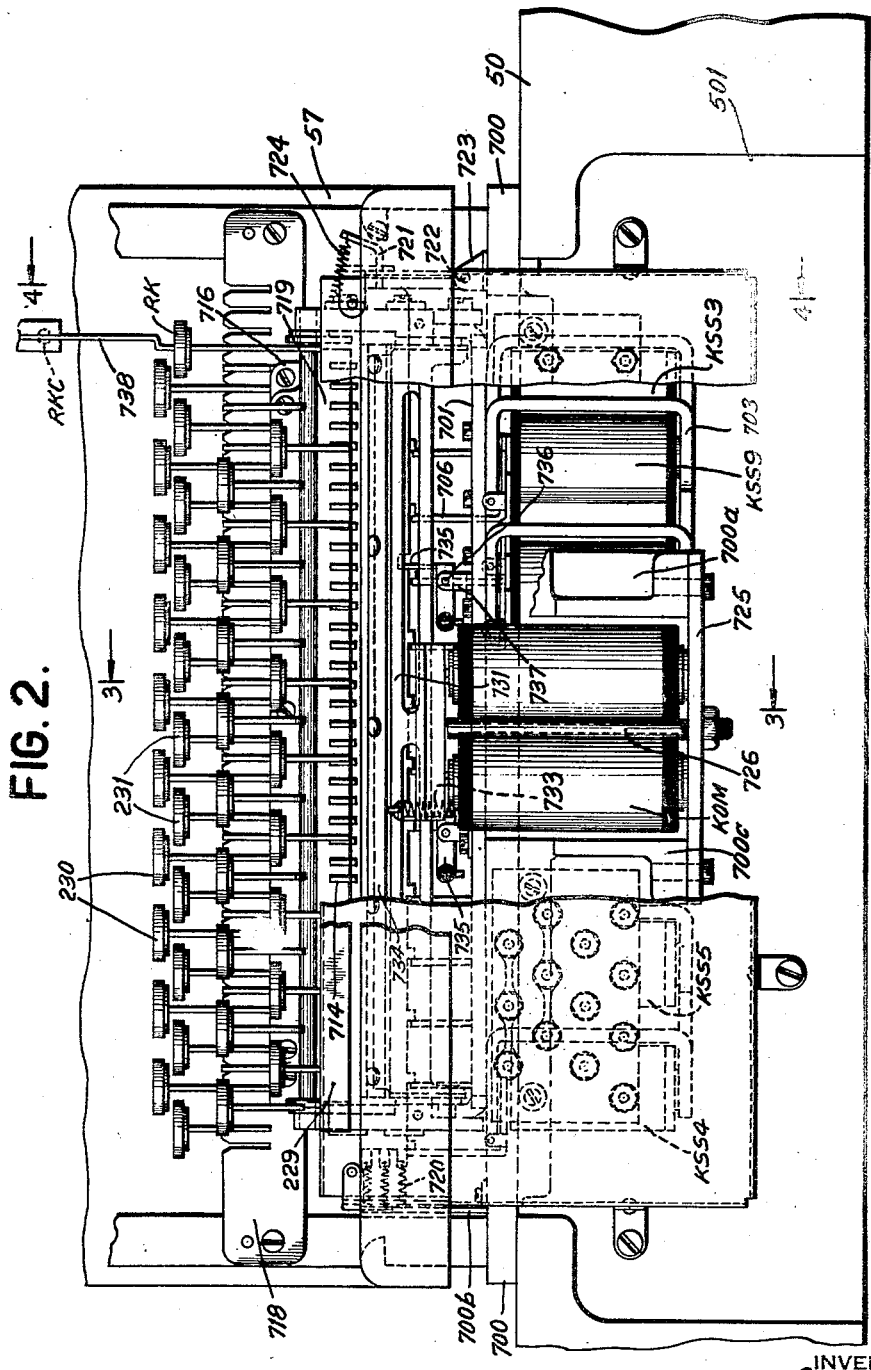

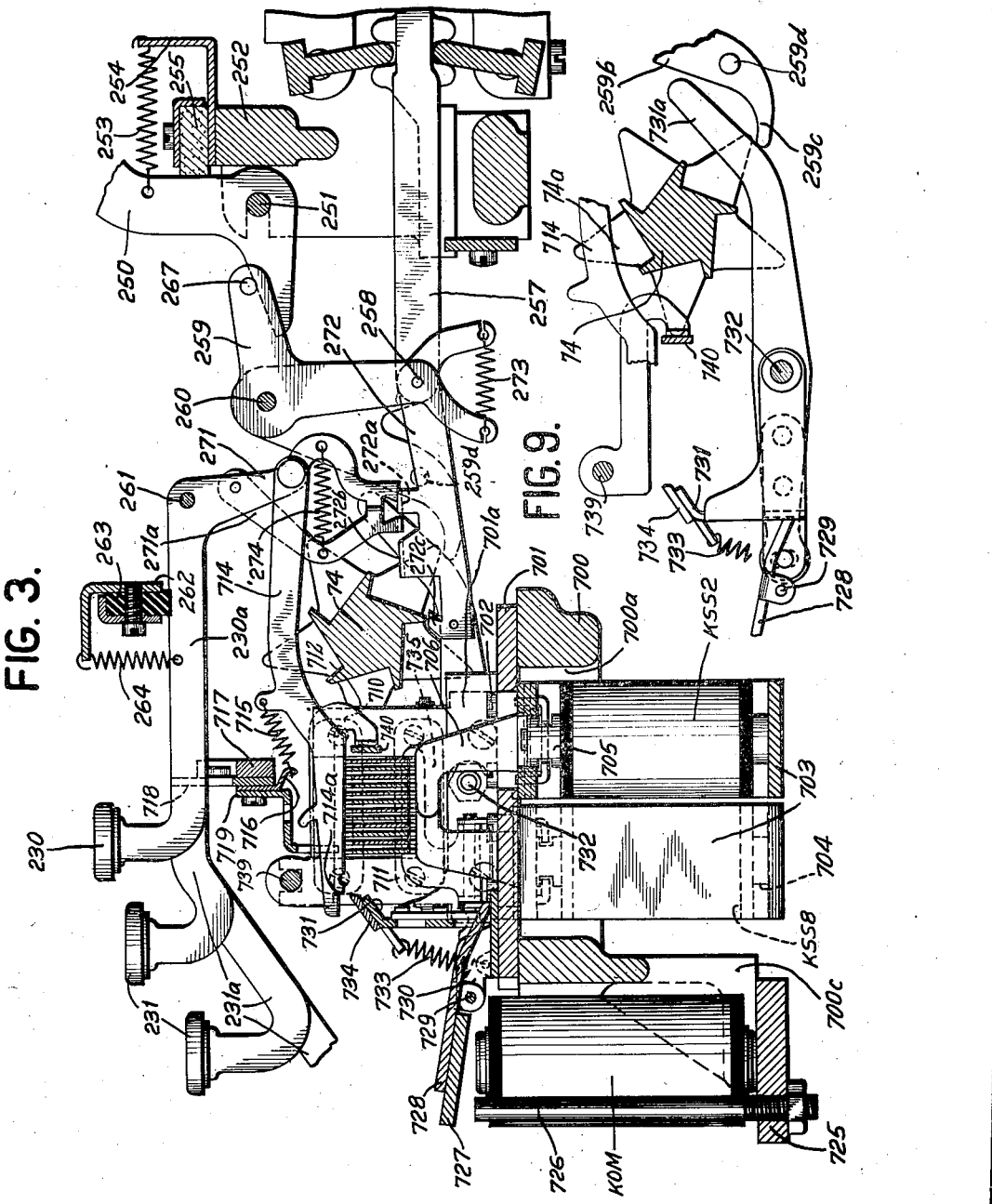

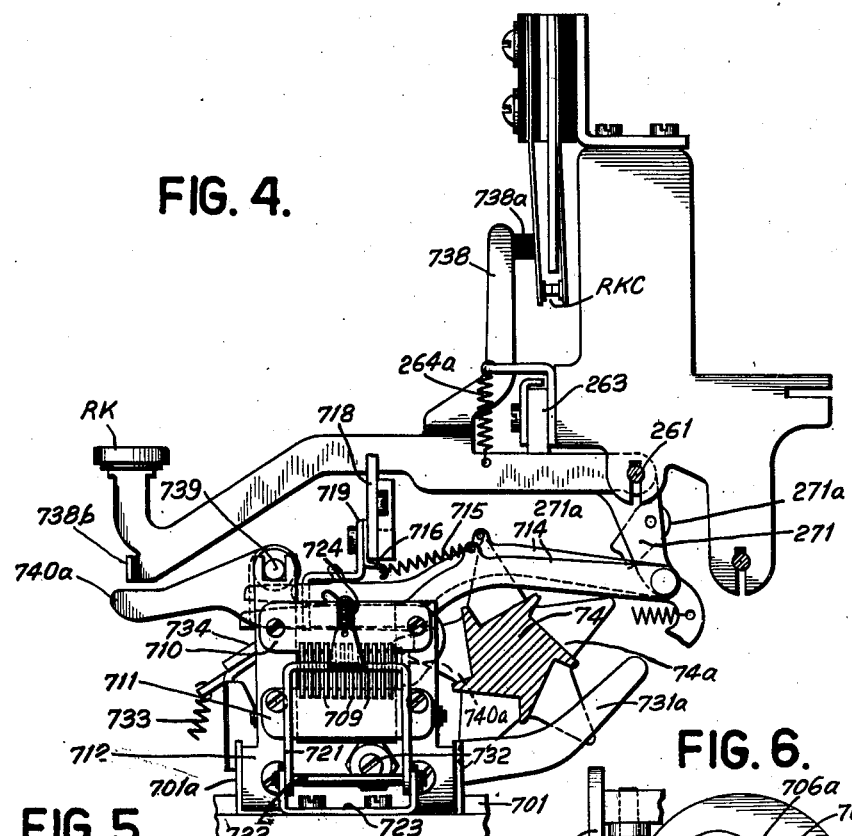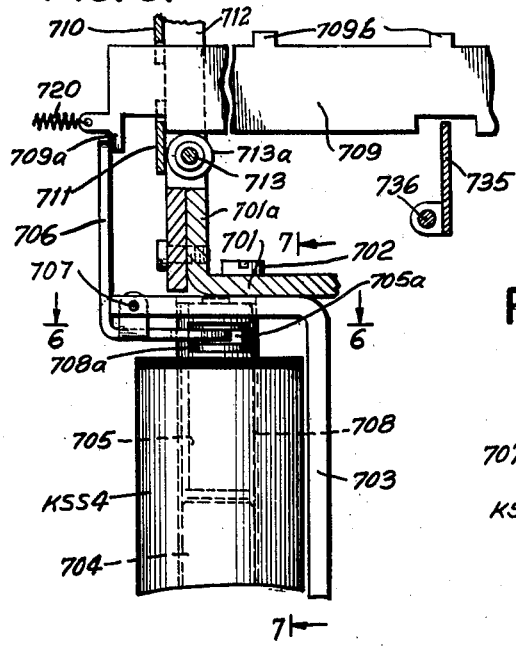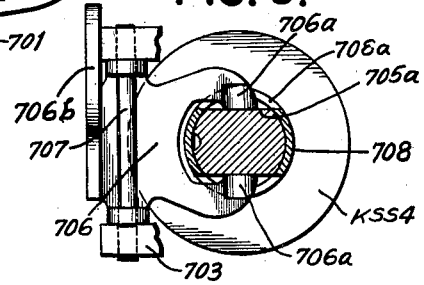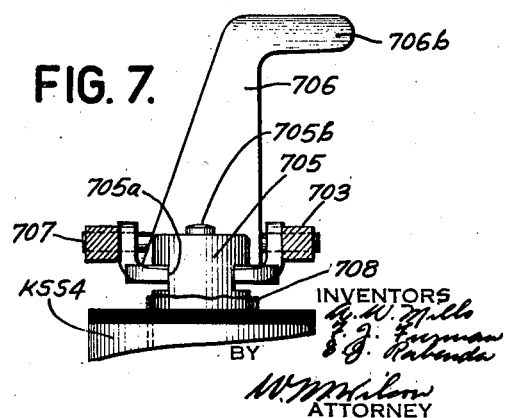

2,315,723

UNITED STATES PATENT OFFICE 2,315,723

RECORD CONTROLLED MACHINE

Albert W. Mills and Frank J. Furman, Endicott, and Edward J. Rabenda, Binghamton, N. Y., assignors to International Business Machines Corporation, New York, N. Y., a corporation of New York Application October 13, 1941, Serial No. 414,818

27 Claims. (Cl. 197—20)

This invention relates to key controlled and record controlled accounting and statistical machines and is an improvement upon the mechanism disclosed in Patent No. 2,046,082, issued June 30, 1936, to A. W. Mills.

The above patent discloses a combined punching and printing machine for preparing the perforated accounting and statistical record cards, such as is used in the well known Powers and Hollerith systems of accounting. This machine not only punches holes representative of data to be recorded in a card, but also prints the data on the card and includes a duplicating mechanism which enables certain data to be automatically duplicated in the card under control of a separate master card.

In the Mills patent, a relay system is provided which is controlled by the brushes which sense the master card and in turn control a system of solenoids for operating the printing and punching keys of the machine. Each key is provided with a key operating solenoid and these solenoids are selectively energized under control of the record sensing brushes according to the number and disposition of the holes in the columns of the master card.

The present invention is concerned with a mechanism for operating the keys under control of the sensing brushes which requires fewer relays, is more positive in its action, and reduces by more than two-thirds the number of operating magnets or solenoids for the keys employed by the key selecting and operating mechanism of the Mills patent.

An object is to provide a key operating mechanism for record controlled machines which is more accurate in its operation and less liable to misoperations which frequently occur when sole dependence is placed in a single low power solenoid individual to the key to operate it as in the above patent.

An object is to provide a key selecting and operating mechanism with a checking means which prevents operation of the printing means when the selector bars which select the keys for operation are not set up in agreement with electrical circuits which are established by the record sensing mechanism.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a vertical section through the machine.

Fig. 2 is a large scale front elevation, partly in section, of the mechanism for operating the keys.

Fig. 3 is a vertical section on the line 3—3 in Fig. 2.

Fig. 4 is a vertical section on the line 4—4 in Fig. 2.

Fig. 5 is a large scale detail view of one of the selector bar operating solenoids.

Fig. 6 is a horizontal section on the line 6—6 in Fig. 5.

Fig. 7 is a vertical section on the line 7—7 in Fig. 5.

Fig. 8 is a plan view of the selector bars showing the arrangement of the lugs.

Fig. 9 is a detail view in vertical section of the key operating bail.

Fig. 10 is a plan view of the selector bar contact operating mechanism.

Fig. 11 is a front elevation of the selector bar contact operating mechanism.

Figure 12:
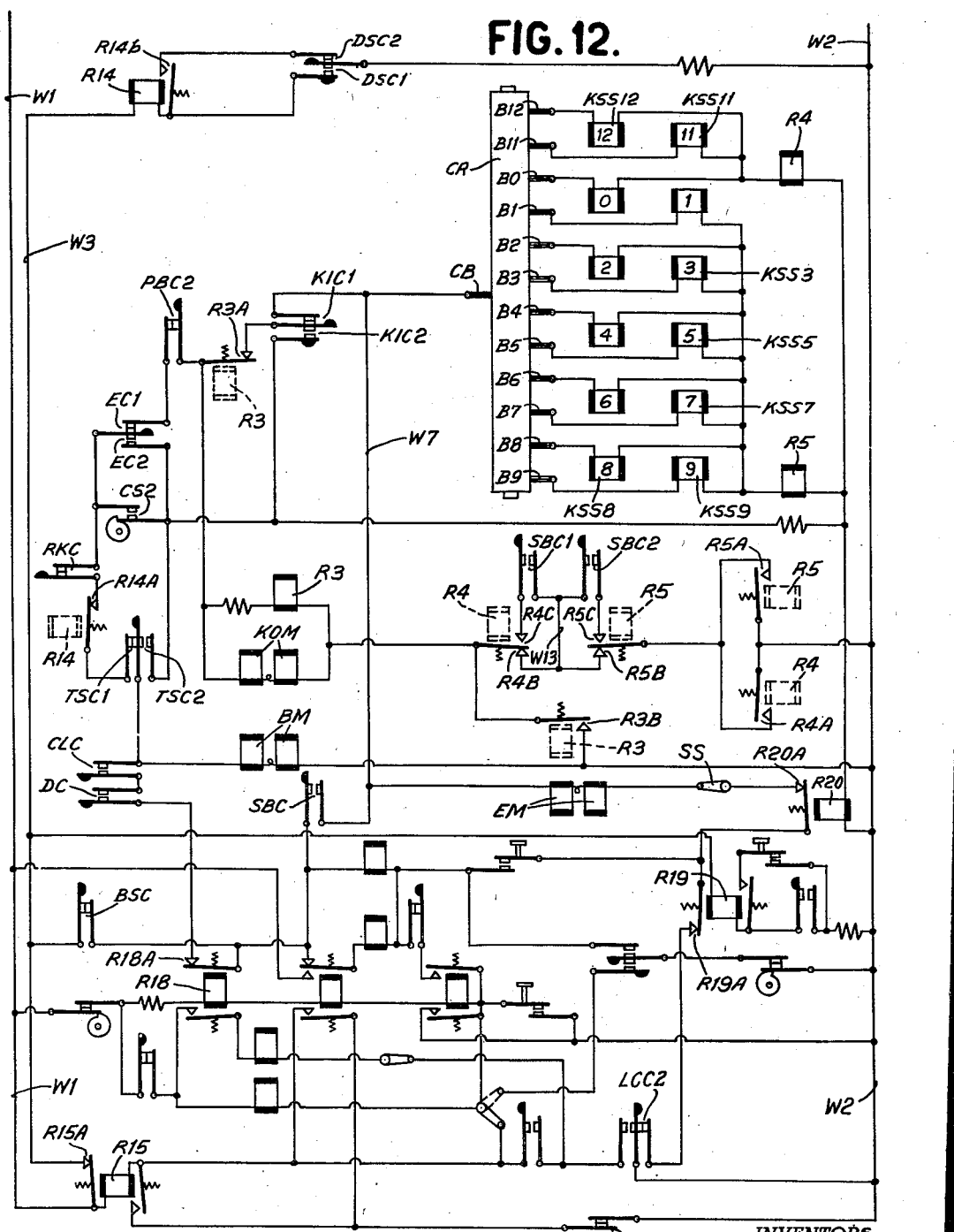
Fig. 12 is a wiring diagram.

The contacts of the various relays will be designated the same as the relays and will be differentiated by adding the letters A, B, and C. Thus R14A designates contacts of relay R14.

The present invention is shown as applied to the machine disclosed in the above Mills patent and such machine is changed mechanically only to the extent that there is substituted for the key selecting solenoids and relay system of the above patent a mechanical key operating mechanism which is controlled by only twelve key selecting solenoids designated KSS0 to KSS9, KSS11, and KSS12, respectively, and is operated by a key operating magnet KOM common to all of the character keys. Except for the fact that in the present case the key interlock, escapement, and tabulating solenoid contacts are modified to the extent that an additional set of contacts is provided for each which are arranged to close whenever a character key or the tabulating key is depressed, the machine is identical in all respects with the machine disclosed in the patent. In the present case, the contacts designated KIC1 in Fig. 12 are typical and are similar in function to the contacts KIC of the patent, while the contacts KIC2 are the ones mentioned above which close whenever a key is depressed.

As a preliminary to the description of the present invention, a very brief description will be given of the keyboard mechanism and the printing mechanism controlled thereby, this mechanism being the same as in the above patent. The reference numerals and letters designating the electrical relays, magnets, and so on are the same as in the Mills patent as far as possible.

With reference to Figs. 1 to 3 inclusive, the machine is provided with numeral keys 230 and alphabetic keys 231 the key levers 230a and 231a of which are pivoted on a rod 261 and held against a stop bar 263 by means of springs 264 which urge the key levers 230a in a clockwise direction with particular reference to Fig. 3. Each key lever 230a, 231a has an extension on arm 271 to which is pivoted an arm 271a actuated by a spring 274 normally holding a stop portion on the arm 271a against a similar stop portion on the arm 271.

The type bars 234 (Fig. 1) are pivoted on the usual wire segment 235 by means of the pivot wire 238 and are actuated by means of sub-levers 250 which are pivoted on a cross rod 251 (see Fig. 3 also) carried by the frame 252. Each sub-lever 250 has a pin 249 extending into a slot in the type bar 234 whereby the rocking of each sub-lever 250 in a counterclockwise direction (Fig. 1) effects clockwise movement of a type bar. The sub-levers 250 and type bars 234 are restored by means of springs 255 anchored to a member 254 and the springs 253 hold the sub-levers 250 against a stop 255.

Associated with each sub-lever 250 is a lever 259 having a pin 267 engaging one arm of the sub-lever 250, whereby the sub-lever 250 may be operated by rocking the lever 259 in a clockwise direction. The levers 259 are pivoted on a cross rod 260 and at 258 each is pivotally connected to a horizontal punch operating slide 257 and an operating member 272. Each lever 259 has an extension curving downwardly and to the left (Fig. 3) from the pivot 258 and the punch operating member 272 has a similar extension curving downwardly to the right. To these extensions are anchored springs 273 which tend to urge the members 272 in a clockwise direction.

The members 272 are provided with lugs 272a (Fig. 3) which engage the lower ends of the arms 271 on the key levers 230, 231 and the arms 271a are slightly longer than the arms 271 so as to extend slightly below the lugs 272a. The arms 271 hold the members 272 in the position of Fig. 3 in which a hook-shaped lug 272c on each member 272 is held clear of the universal actuator 74. This actuator is continually driven in a clockwise direction (Figs. 1 and 3) by the driving motor DM while the machine is in use. The slides 257, when drawn to the left, operate the punches as explained in the Mills patent. When any character key 230 or 231 is depressed, its arm 271a is prevented by the lug 272a from rocking in a counterclockwise direction (Fig. 3). Consequently, the movement of the arm 271, in the same direction, opens a space into which the lug 272a may pass in consequence of the tension of the spring 273. Thereby member 272 is permitted to rock clockwise and the lug 272c will be caused to engage one of the moving ribs in the actuator 74. The member 272 will then be drawn to the left, carrying with it the slide 257 and, at the same time, rocking clockwise the lever 259. This, of course, results in the operation of the punch or punches associated with the key depressed and the actuation of the type bar 234 associated with the same key. When any key is depressed, the key interlock bail 380 (Fig. 1) will be rocked clockwise, thereby causing the key interlock contacts KIC1 to open KIC2 to close. The operation of the slides 257 also causes the contacts designated PBC2, termed the punch bail contacts, to open.

The mechanism for operating the keys by power is largely supported on a frame casting 700 (Figs. 1 to 3) located beneath the keyboard in a pocket 501 formed in the base 50. This frame 700 supports on its top surface a plate 701 which largely covers a long rectangular opening 700a (Fig. 3) in the frame 700 which opening extends the entire length of such frame. Secured to the underside of the plate 701 within the rectangular opening 700a in the frame 700, by means of screws 702 (Fig. 5), are the yokes 703 of the twelve key selecting solenoids KSS0 to KSS9, KSS11, and KSS12 respectively. These yokes are shaped like elongated U's with short arms and have the cores 704 of the solenoids secured to the short arms of the yokes 703 opposite the plate 701.

Slidably mounted in the upper end of each coil is a plunger 705 provided with diametrically opposite transverse slots 705a (Figs. 5 to 7) into which loosely project the lugs 706a in a lever 706 pivoted on a rod 707 carried by a yoke 703. The upper end of the plunger 705 is provided with a reduced portion 705b which acts as a stop for the plunger by contacting the underside of the plate 701 and both the core 704 and the plunger 705 are located within a non-magnetic tube 708 extending into a large hole in the upper arm of the yoke 703. This tube 708 is slotted at 708a to accommodate the lugs 706a in the levers 706 and the slot is wide enough to permit the plunger 705a to move up and down freely. The solenoid operated levers 706 project through openings in the plate 701 and each has a lateral extension 706b. The latter engage lugs 709a in twelve selector bars 709, each bar 709 having its own operating solenoid. With reference to Fig. 5, whenever one of the solenoids KSS0 to KSS9, KSS11, KSS12 is energized, its plunger 705 will be drawn downwardly, (Fig. 5) thereby rocking the associated lever 706 clockwise and thrusting the corresponding selector bar 709 to the right.

The selector bars 709 are slidably mounted in upper combs 710 (Figs. 3 and 4) and lower combs 711 of which there is a pair at each end of the group of selector bars, each pair of combs being secured to a vertical plate 712 secured to an upturned portion 701a formed at the end of the plate 701, each of the plates 712 being formed with parallel vertical extensions or posts between which the combs 710, 711 are secured. Each pair of these posts also supports a rod 713 (Fig. 5) on which rollers 714 are rotatably mounted, each roller 714 cooperating with the lower edge of a selector bar 709 adjacent the comb 711. These rollers 714 carry the weight of the selector bars 709 and enable the latter to move longitudinally more freely. The upper edges of the selector bars 709 are formed with lugs 709b arranged as shown in Fig. 8.

Attached to each key lever is an operating member 714 (Figs. 1, 3, 4, and 8) which extends horizontally and transversely over the selector bars 709 and is normally held up by one or more of the lugs 709b, arranged as shown in Fig. 8. The lugs 709b are so arranged that when they are operated singly or in combinations of two, a particular member 714 corresponding to that bar or combination of bars will be allowed to drop, assisted by a spring 715 which is anchored to the member 714 and to a spring anchoring plate 716. The plate 716 comprises a strip formed with tongues to which the springs 716 are anchored and is formed as part of the assembly including the key lock which prevents more than one key from being depressed. This assembly includes a bar 717, a key guiding comb 718, and a comb 719 which is Z-shaped in section with one of the vertical edges slotted for guiding the members 714, these parts all being fastened to the bar 717 by means of common screws. The selector bars 709 are held in the positions of Figs. 2 and 5 by means of springs 720 anchored to a bracket 700b secured to the top surface of the frame 700 at the left hand end.

In order to insure movement of the selector bars 709 in unison when two are operated, there is provided a universal bail 721 (Figs. 2 and 4) which is pivoted on a rod 722 carried by bracket 723 at the right hand end (Fig. 2) of plate 700. This bail is urged in a counterclockwise direction by a spring 724 and abuts the right hand ends of all of the selector bars 709. When two of the selector bars are operated together, if one attempts to move faster than the other, the spring operating the bail 721 will apply an additional load to such advanced bar and retard its movement sufficiently to enable the other bar to keep up with it. In order to insure the proper selection of a member 714, it is absolutely necessary that both of two selected bars operate in unison. This is because of the fact that the members 714 normally rest upon the lugs 709b in the bars 709 and movement of only one is sufficient to release a member 714.

Whenever a member 714 is released and allowed to drop by the movement of one or a pair of the selector bars 709, the selected member 714 and the associated key is operated by power which conveniently takes the form of an operating magnet KOM which may be termed the key operating magnet. As most clearly shown in Figs. 2 and 3, this operating magnet KOM comprises a pair of coils and cores mounted on a plate 725 secured to downward extensions 700c of the frame 700. This plate 725 also supports an armature stop post 726 which acts to limit movement of an armature 727 secured to a member 728 pivoted at 729 to a bracket 730 mounted on the top of the plate 701. The member 728, as most clearly shown in Fig. 9, has an extension underlying the middle part of the crossbar of a bail 731 pivotally mounted at 732 in the upturned lugs 701a which support the plates 712. The bail 731 is urged in a counterclockwise direction (Figs. 1, 3, 4 and 9) by means of a spring 733 anchored to the plate 701 by means of a suitable spring clip (not shown). It is apparent from Fig. 3 that whenever the magnet OM is energized, the operating bail 731 will be actuated in a clockwise direction.

The bail 731 has secured to it a beveled bar 734 adapted to engage a notch or shoulder 714a formed in the left hand end (Fig. 3) of a selected member 714. If any member 714 is allowed to drop and the magnet KOM is energized, the bail 730 will be rocked clockwise (Fig. 3) and the bar 734 engaging the notch 714a in the member 714 will push the latter to the right in Fig. 3, thereby rocking the key counterclockwise. This, of course, will cause an operation of the type bar associated with the operated key.

The selector bars 709 operate two sets of contacts designated SBC1, SBC2, respectively, in Fig. 12. For this purpose, as shown in Figs. 10 and 11, there is provided two slots like 709c on the lower edge of each of the bars 709, these slots being so disposed on the bars that the selector bars 709 corresponding to the magnets KS0, KS11, KS12, when moved to the right in Figs. 2 and 5 rock the left hand one of two bails 735 pivoted at 736 on a bracket 737 secured to the top of the plate 701. With respect to the left hand bail 735, appearing in Figs. 5, 10, and 11, the slots 709c in the selector bars corresponding to the solenoids KS1 to KS9, are so wide, as shown in Figs. 5 and 10, that these selector bars cannot operate the left hand bail 735.

The left hand bail 735 has an extension 735a carrying an insulating button 735b disposed underneath one of a pair of spring contact members carrying contacts SBC1, these members of each pair being suitably insulatably mounted on a bracket 738 carried by the plate 701 to the left of magnet KOM in Fig. 2. Whenever the selector bars for solenoids KSS0, KSS11, KSS12 move to the right, the bail 735 will be rocked clockwise, thereby causing the pin 735b to rise and close the contacts SBC1. The right hand bail 735 similarly operates contacts SBC2 to close the latter whenever any of the selector bars 709 corresponding to the magnets KSS1 to KSS9 are operated. These latter selector bars, however, do not operate the contacts SBC1.

There are certain conditions under which it is possible for one of the members 714 to drop but it may happen that the magnet KOM is not energized to operate the selected member 714 and thereby restore such member to the raised position. While any member 714 is in the released position, movement of some of the selector bars 709 will be blocked and it will be impossible to restore the moved selector bar. Accordingly, provision is made whereby the operator may restore any member 714 which has been selected without an operation of the type bar immediately following, arising from failure to energize the magnet KOM.

This means includes a restoring key RK located at the right hand end of the keyboard (Fig. 2) and having an upward extension 738 (see Fig. 4 also) carrying an insulating button 738a cooperating with one of a pair of spring contact members carrying restoring key contacts RKC. The key RK is held up by a spring 264a which normally maintains the contacts RKC closed. Pivotally mounted on a rod 739 carried by the plates 712 is a release bail 740 which extends parallel with the selector bars 709 and underneath all of the members 714. This bail has an arm 740a at the right hand end which underlies a lug 738b formed in the key lever of key RK.

With reference to Figs. 4 and 9, depression of the key RK, through the engagement of the lug 738b with the arm 740a, causes the bail 740 to rock counterclockwise and lift any operated member 714 which may have been allowed to drop by movement of the bars 709. Lifting of the selected member 714 will allow any of the bars 709 which may be held in the operated position by engagement of their lug 709b with the sides of the selected member 714 to be drawn to the left (Fig. 1) by their springs 720, thus placing the operating mechanism for the keys in condition to effect a second selection.

The operating bail 731 is provided with an extension 731a (Fig. 9) which is used to positively restore the bail 731 in the event that the armature 727 should stick to the poles of the magnet KOM from residual magnetism. This extension is engaged by a pin 259d on arm 259b and is rocked counterclockwise when the arm 259b is moved in a clockwise direction during the operation of the selected punches and type bar. The arm 259b cooperates with the cam 74a to positively restore the punches as described in the Mills patent.

The operation of the machine will now be described with reference to the wiring diagram (Fig. 12), it being assumed that relay R14 has been energized as described in the Mills patent to prevent automatic duplicating and that this relay is being kept in energized position by a holding circuit through its contacts R14B and the duplicating start contacts DSC2. As soon as the carriage moves to the first column in which automatic duplicating is to commence, the No. 5 stop in such column, as described in the Mills patent, operates upon the contacts DSC2 to interrupt the holding circuit for the relay R14, thereby allowing its contacts R14A to close. This enables circuits to be established through the brushes B0 to B9, B11, and B12 which sense the master card.

It will be assumed that the first column of the field contains the letter "A" represented by a "1" hole and a "12" hole. The brushes B12 and B1 establish two separate circuits as follows: line wire W1, contacts R15A, back space contacts BSC, contacts R18A, door contacts DC, card lever contacts CLC, tabulating solenoid contacts TSC1, contacts R14A, restoring key contacts RKC, escapement contacts EC1, punch bail contacts PBC2, contacts R3A, key interlock contacts KIC1, common brush CB, contact roller CR, the brushes B12 and B1, respectively, the solenoids KSS12 and KSS1, respectively, relays R4 and R5 in parallel, and relay R20 in common, to line wire W2. The relays R4 and R5 close their contacts R4A, R4C and R5A, R5C while the solenoids KSS12, KSS1 operate their respective selector bars 709 and thereby cause the closure of both contacts SBC1, SBC2. Also, due to the movement of the selector bars, the member 714 for the "A" key is allowed to drop as described above but for the moment nothing happens as magnet KOM has not yet been energized.

The closure of contacts R4C, SBC1, SBC2, R5C, R4A, R5A sets up a parallel circuit from the contacts PBC2, through the relay R3 and magnet KOM in parallel, contacts R4C, SBC1, SBC2, R5C, R4A, R5A to line wire W2. Relay R3 opens the circuit through the brushes and closes a momentary holding circuit through its contacts 3B in parallel with the circuit just traced through contacts SBC1, SBC2. Magnet KOM is energized and effects the operation of the "A" key as explained above. Finally "12" and "1" holes are perforated in the blank card and the letter "A" is printed above such holes in the manner described in the Mills patent.

The operation of the perforating mechanism and escapement mechanism causes the contacts PBC2 and EC1 to open, thereby deenergizing the momentary holding circuit through the relay R3 and magnet KOM, last traced above. The energization of the magnet KOM lifts the member 714 for the "A" key up high enough to release the "12" and "1" selector bars 709, permitting their springs 720 to draw such bars back to the position of Fig. 5 in readiness for another operation.

It is conceivable that for some reason or other both selector bars 709 might not operate. For example, one might stick too tightly for its solenoid to operate it. Let it be assumed that when both relays R4, R5 are energized, one of the group of selector bars corresponding to the solenoids KSS0, KSS11, KSS12 fails to operate. This causes contacts SBC1 to remain open while contacts SBC2 will close. This prevents a circuit from being established through the magnet KOM. Since one of the selector bars corresponding to solenoids KSS1 to KSS9 has been operated the corresponding selector bar will be held in operated position. This is true because the member 714 directly associated with the operated solenoid will have been allowed to drop in exactly the same manner as if a single hole had been present in the card column with the result that one of the lugs 709b will engage the side of the released member 714 and prevent it from being drawn back to the normal position. Thus, in a case like this, nothing will happen after the column has been sensed and the machine will not only fail to print and punch but the carriage will not escape, thereby warning the operator that a misoperation has taken place.

The contacts of the relays R4 and R5 and contacts SBC1, SBC2 are so arranged that the energization of the relay R5 in consequence of there also being a hole in the 1 to 9 positions, respectively, will prevent any circuit from being established through contacts R4C and SBC1 through the jumper connection W13 because relay R5 switches the circuit to contacts SBC2 which have not closed because of failure of one of the selector bars corresponding to the solenoids KSS1 to KSS9 to operate. In order to free the machine for another operation, the operator presses the duplicating reset key DRK, thereby opening the contacts RKC to break the brush circuits and also, by means of bail 740, raising the member 714 which was selected to enable the locked selector bar 709 to return to its normal position. Since no hole has been perforated and the printing mechanism did not operate, the operator may again press the same key and it may be that this time the machine will operate correctly and punch both holes and print the proper character on the blank card.

The relay system including the relays R4, R5 is so devised that a single hole may be perforated and a corresponding character printed without interrupting the operation of the machine as above. It will be assumed that there is a "9" hole occurring in a given column. A circuit will be established in this case only through the brush B9 and the solenoid KSS9 and relay R5. In this case only contacts SBC2 will close and, since relay R5 is energized and relay R4 deenergized, the circuit for magnet KOM can be established through the contacts R4B, the jumper wire W13, contacts SBC2, R5C, and R5A, to line wire W2. Had the hole been present in the "12" index point position, contacts SBC1 and R4C will be closed, permitting a circuit for magnet KOM to be established through contacts R4C, SBC1, jumper W13, contacts R5B and R4A to line wire W2.

It will thus be seen that as long as the selector bars operate in agreement with the holes in the card and the establishment of the proper circuits through such holes, the proper key will be operated, but, if the proper circuits are set up and the proper selector bars are not operated, an interruption of the operation in the machine will be forced upon the operator and it will, therefore, not be possible to continue to operate the machine without knowing that all of the holes are not being perforated in the card. Without the checking circuit, if it should happen that only a single bar operates where two should operate, the machine would punch the character corresponding to the single bar operated. Thus, all characters which require operation of a given selector bar would not be printed correctly but only the character corresponding to the single one that operated would be printed and punched. Thus, if the "9" bar, for instance, should stick, all characters requiring the operation of a "9" bar, that is, the code comprising a "9" hole with another hole, such as a "12", would cause the character corresponding to the "12" hole alone to be printed. It will be understood that this arises from the fact that, in the Hollerith alphabetical code as shown in the Mills patent, the individual holes represent characters and combinations of such holes represent other characters. With the checking circuit described above, if a single hole occurs and the selector bar for that hole does not operate, the operation of the machine will be interrupted. When a single hole is sensed, and the corresponding selector bar fails to operate, the proper series circuit through contacts SBC1 or SBC2, as the case may be, will be interrupted by failure of one or the other of these contacts to close. The contacts R5A, R4A prevent energization of the magnet KOM when a column is blank.

It may happen during the course of duplicating an alphabetic field that some of the columns are left blank for spacing characters apart as, for instance, the initials of a name, this being explained in the Mills patent as a well known practice. When the carriage escapes to a column in which no perforation appears, it will automatically be spaced to the next column provided the switch SS is closed. The relay R20 is a fast operating relay which, when a hole is sensed, prevents energization of the escapement magnet EM prematurely. This relay opens its contacts R20A before the relatively slow acting magnet EM can build up its flux sufficiently to operate the escapement mechanism. When no hole is present in any column, relay R20 remains deenergized and its contacts R20A remain closed. As the carriage escapes from a column in which a hole is punched to one in which no hole appears in the master card, the reclosure of contacts PBC2 causes a circuit to be closed through the magnet EM as follows: line wire W1, contacts R15A, BSC, R18A, DC, CLC, TSC1, R14A, RKC, EC1, PBC2, R3A, KIC1, magnet EM, switch SS, contacts R20A, R19A, and contacts LCC2, to line wire W2. The energization of magnet EM as described in the Mills patent causes an operation of the escapement mechanism to take place, whereby the carriage will be spaced one column. When the machine is operated manually, the depression of any key causes the contacts KIC1 to open and thereby prevent energization of the magnet EM. The depression of the space bar 229 (Fig. 1) causes space bar contacts SBC to close and energize the escapement magnet EM by a circuit as follows: line wire W1, contacts R15A, BSC, SBC, magnet EM, switch SS, contacts R20A, R19A, and LCC2 to line wire W2.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described, means to sense a record containing designations disposed in different index point positions, a series of selector bars corresponding to said positions, means controlled by the sensing means through a designation in each index point position for moving one of said bars, a series of operable elements cooperating with said bars and selected by movement of said bars; a power operating member for said operable elements, said elements when selected by movement of said bars being positioned in an operating relationship with the operating member; means for actuating said operating member; and means for rendering the actuating means operative, said means being responsive to the movement of said selector bars to select the operable element.

2. In a machine of the class described, character printing keys, selectively operable elements connected to said keys, means to sense a record containing data designations disposed in a plurality of index point positions; a series of selector bars, one for each index point position, means controlled by said sensing means for setting said selector bars singly and in combinations to represent characters denoted in the record by means of said designations, a common operating member for all of the operable elements, said operable elements when selected by movement of said selector bars being placed in an operative relationship with the common operating member, and means for operating said common operating member rendered effective by the movement of the selector bars to select one of said elements.

3. In a machine of the class described, a record sensing device comprising a series of separate electrical sensing elements, each for sensing a single index point position in a record column, characters being represented in such column by designations occurring singly and in various combinations in said index point positions; recording mechanism, a series of operable elements, each element representing a character and when actuated causing such character to be recorded by the recording mechanism; a series of selector bars corresponding in number to the index point positions in said column; a series of control magnets, each for effecting an operation of one of said bars and controlled by one of said electrical sensing elements whereby said selector bars are set singly and in combinations to correspond with designations in said column, said bars when set selecting one of said operable elements for operation; a common operating member for said operable elements, said elements when selected moving into a position to be operated by the common operating member; a magnet for operating the common operating member, and contact means controlled by the movement of said selector bars for causing the magnet to operate.

4. In a machine of the class described, a series of operable elements, each representing a character; recording mechanism controlled by said elements, a series of selector bars movable singly and in various combinations to select one of the operable elements for operation, an operating member common to all of the operable elements for operating the selected element, a device for sensing a record wherein data is represented by a combinational code, means controlled by said sensing device for setting said selector bars to correspond with the code designation of a character, power means for operating said common operating member, and an electrical control circuit for said power means, said control circuit including contact means operated by the movement of the selector bars to select an operable element for operation.

5. In a machine of the class described, means to sense data designations in a record, a series of operable elements, each representing a character; a series of selector bars common to all of said operable elements and movable singly and in combination to represent a character and by such movement to select the operable element corresponding to such character, means to operate the selected element, and means jointly controlled by the record sensing means and by movement of the selector bars for causing operation of the operating means for said element.

6. In a machine of the class described, a series of operable elements, each representing a character; a series of selector bars common to said elements, said selector bars being movable singly and in combination to select one of the operable elements for operation; means for operating the selected element, a device for sensing combinational code designations in a record, means controlled by the sensing device for moving said bars singly and in combinations to represent a character sensed; and a control circuit for the operating means, including contact means controlled by the record sensing device and contact means controlled by the movement of the selector bars, for causing operation of the operating means.

7. In a machine of the class described, a record sensing device for sensing combinational code data designations in a record; power operated recording means including a series of operable elements, each representing a character; a series of selector bars common to said elements and movable singly and in combinations to represent characters designated by the code designations; means controlled by the sensing device for setting said bars to correspond with said code designations, said bars, when moved by said setting means, selecting one of the selectively operable elements for operation; means common to all of the selectively operable elements for operating the selected element, and means dependent upon both the sensing device and the movement of the selector bars for controlling the operation of the operating means.

8. In a machine of the class described, means for sensing a record having data designations in index point positions arranged in columns, each column having two groups of index point positions, characters being represented by the combination of a data designation in any one of one group of index point positions and a data designation in any one of the other group of index point positions; a series of selectively operable elements, each representing a character; recording mechanism controlled by said elements, a series of selector bars common to the selectively operable elements and equal in number to the index point positions in a column, means controlled by the record sensing means for positioning said selector bars to represent a data designating combination occurring in a single column, operating means for the selectively operable elements, a pair of control devices corresponding to the two groups of designations and operated by any of the selector bars corresponding to said groups of designations; and means controlled by both said control devices and the record sensing means for causing an operation of the operating means, said last named means being inoperative unless a selector bar in each group is operated.

9. In a machine of the class described, recording means, a series of selectively operable elements, each representing a character to be recorded; means for sensing a record containing columns of index point positions, each column being divided into two groups of index point positions, characters being represented by the combination of a designation in one of the positions of one group and a designation in the other group; a series of selector bars corresponding to the index point positions in a single column and arranged so that a movement of a selector bar in one group and a selector bar in another group selects the selectively operable element corresponding to a combination of data designations in the record column, a common operating member for the selected elements, power means for operating said member; means controlled by the record sensing means for setting said selector bars, one in each group, to correspond with the designations in the record column; and a checking circuit for controlling the power means, said checking circuit having contact means closed by movement of the selector bars and contact means controlled by the record sensing means for rendering the power means effective only when the selector bars are set in agreement with the designations in the record column.

10. In a machine of the class described, recording means, a series of selectively operable elements for controlling the recording means, each representing a character to be recorded; means for sensing a record containing columns of index point positions, each column being divided into two groups of index point positions, said characters being represented by the combination of a designation in one group and a designation in the other group; a series of selector bars corresponding to the index point positions and arranged so that the movement of both a selector bar in one group and a selector bar in another group selects the selectively operable element corresponding to the data designations in the record column, a common operating member for the selected element; power means for operating said member; means controlled by the record sensing means for setting said selector bars, one in each group, to correspond with the designations in the record column; a checking circuit for controlling the power means, said checking circuit having contact means closed by movement of the selector bars and contact means controlled by the record sensing means for rendering the power means effective only when the selector bars are set in agreement with the designations in the record column, and manual means to effect restoration of any selected element and the operated selector bars in the event that a disagreement occurs.

11. In a machine of the class described, a series of selectively operable elements, each representing a character, selector bars cooperating with the selectively operable elements and when selectively moved causing the selection of one of said elements for operation, said selector bars when moved to effect the selection becoming locked by the selected element; spring means coacting with said elements to hold them in selected position, a restoring key, and means controlled by the restoring key for restoring the selected element to normal position to thereby release the operated selector bars.

12. In a machine of the class described, a series of character keys, recording mechanism controlled by said character keys; selectively operable elements, each individual to a character key and connected thereto for operating such key; a series of selector bars disposed transversely of said elements and with their edges engaging said elements, the edges of said selector bars being so shaped that movement of the selector bars away from a normal position selects one of said elements for operation, and also so shaped that the selected element locks the selector bars in operated position; spring means to hold said elements in operated position, a restoring member common to all of said elements and operable to restore the selected element to its normal position and to thereby release the selector bars for restoration to their normal position, and a key for controlling operation of the restoring member.

13. In a machine of the class described, the combination of a series of record sensing brushes, each for sensing an index point position on a record in which characters are recorded by combinations of designations in said index point positions; a series of selector bars corresponding to the index point positions; magnets, one for each bar, for moving said bars from a normal position; a plurality of circuits each including one of said magnets and one of said brushes, each brush having its corresponding magnet whereby each magnet may be energized when the corresponding brush encounters a designation in the index point position sensed by said brush; a series of selectively operable elements, each corresponding to a character and extending transversely of said selector bars; spring means holding said elements in cooperation with the edges of said selector bars, said edges being so shaped that movement of a single selector bar, or a combination of selector bars, corresponding to the designations of a character in the record column selects the element corresponding to such character and permits said element to move transversely of the selector bars under the influence of the spring means; an operating bail into cooperation with which the selected element moves, a magnet for operating said bail, and circuit closing means operated by said selector bars and controlled by the first named circuits for causing an operation of said magnet upon the selection of one of said elements.

14. In a machine of the class described, the combination of a series of record analyzing circuits each including contact means closed by the presence of a designation in an index point position of a record, characters being designated by combinations of designations in said index point positions, a series of selector bars set combinationally under control of said circuits to represent the character sensed, power key operating means controlled by the positions of said selector bars, and means controlled by the movement of said selector bars for controlling the operation of the power means.

15. In a machine of the class described, power operated mechanism including selectively operable elements, a power device for operating said elements including a main operating member and a series of selector bars movable to bring about a cooperative relationship between the main operating member and a selected element, a record sensing device, means controlled by the record sensing device for setting said bars, and means controlled both by the record sensing device and by movement of the selector bars for causing an operation of the power device.

16. In a machine of the class described, a combinational hole sensing means, a series of keys, power operated recording mechanism controlled by said keys, key selecting mechanism controlled by said sensing means, power means for operating a selected key, and means controlled jointly by the record sensing means and the key selecting mechanism for causing an operation of the power key operating means.

17. In a machine of the class described, a key controlled mechanism, power means to selectively operate the keys of said mechanism including a power magnet, a series of selector bars settable combinationally to select a key to be operated and means operated by the magnet for actuating the selected key; a record sensing device; magnets, one for each selector bar, for operating said bars to select a key to be operated; circuits connecting said magnets to the sensing device, a control circuit for the power magnet, and contact means in said circuit controlled by the selector bars for energizing the power magnet.

18. In a recording machine, the combination of a series of keys, a series of key operating elements, an operating member for said elements, a series of selector bars extending crosswise of said elements; spring means for holding said elements in cooperation with the edges of said selector bars, said selector bars having their edges shaped so that movement of the selector bars singly and in combination away from a normal position allows one of said key operating elements to be moved by its spring means to a position for subsequent operation, a magnet for operating said member, contact means actuated by said selector bars for controlling said magnet, a record sensing device, means controlled by said record sensing device for moving said selector bars, and contact means controlled by said sensing device for controlling said magnet.

19. In a machine of the class described, the combination of a series of character keys, recording mechanism controlled by said keys, selectable key operating elements, a series of key selecting bars having selection lugs disposed in different positions on the edges thereof, spring means holding said key operating elements in coaction with the lugs on said bars, said bars when moved singly or in combinations releasing said operating elements to enable said spring means to draw said elements into an operated position; an operating bail common to all of the selectable elements, and, when moved, engaging the selected element to operate the key connected with such selected element; a magnet for operating said bail; a series of record sensing brushes, each for sensing a particular index point position in a column of a record field in which index point positions appear data designations representing characters; circuits including said brushes and including operating magnets for moving the selector bars to position said selector bars to represent the data designations in the column sensed, and a control circuit for said bail operating magnet including contacts operated by said selector bars and contacts controlled by the sensing circuits for closing the circuit to said bail operating magnet.

20. In a machine of the class described, a series of selectively operable character elements, each representing a character; a series of selector bars movable singly to select a character element and also movable in different combinations to select other character elements; a record sensing device including a plurality of contact elements, each corresponding to a selector bar, a series of circuits from said contact elements, each circuit corresponding to one of said bars and including a magnet for moving the bar when the corresponding contact element is closed; and means associated with said bars for compelling said bars to move in unison when a character designation calling for the movement of two bars in unison is sensed.

21. In a machine of the class described, selectively operable elements; a series of selector bars having their edges provided with lugs cooperating with said selectively operable elements to hold them in an inoperative position, said selector bars being movable singly to select certain elements and also movable a plurality at a time in different combinations to select other elements, said bars, when moved to select an element, permitting such element to move to an active position; and means engaged by all of said bars for compelling them to move in unison if a combination is moved.

22. In a machine of the class described, the combination of a plurality of selectively operable elements each representing a character, a series of selector bars cooperating with said character representing elements and movable longitudinally both singly to select certain of the character representing elements and in unison to select a different character representing element, means individual to each bar for moving said bar, and a bail engaged by all of said bars and moved thereby for compelling the bars to move in unison.

23. In a machine of the class described, the combination of a series of selectively operable elements each representative of a character, a series of selector bars mounted for longitudinal movement and disposed transversely of the selectively operable elements, said selector bars when moved longitudinally singly representing certain characters and selecting the operable elements for such characters and when moved in combinations selecting the operable elements for other characters; a series of magnets each corresponding to a bar, for moving such bar; and means for compelling two bars to move in unison when a plurality of the magnets are energized.

24. In a machine of the class described, a series of selectively operable elements; power operated means controlled by said elements, each element when operated having a different effect upon said power operated means from the other elements; a combinational hole sensing means, selecting mechanism for said elements controlled by said sensing means, power means for operating a selected element, and means controlled jointly by the sensing means and by the element selecting mechanism for causing an operation of the power means.

25. In a machine of the class described, a series of selectively operable elements, means controlled by said elements, each element having a different effect upon said means; power means to selectively operate said elements including a power magnet and a series of selector bars settable to select the element to be operated by said power magnet, a record sensing device; magnets, one for each selector bar, for operating said bars to select an element to be operated; circuits connecting said magnets to the sensing device, a control circuit for the power magnet, and contact means in said circuit controlled by the selector bars for energizing the power magnet.

26. In a machine of the class described, selectively operable elements, power means for selectively operating said elements including a series of members representing index point positions in a record and movable to represent combinations of designations in said index point positions, record sensing devices, actuating devices, each controlled by a sensing device, and each individual to an index point position, for moving said members independently of each other, and means cooperating with all of said members to compel them to move in unison.

27. In a machine of the class described, a series of selectively operable elements, a series of movable members each for controlling the operation of said elements and representing an index point position in a record, a device for sensing data designations in said index point positions, means individual to each of said members and controlled by said sensing device for setting said members upon the occurrence of data designations in a record, and means operative when a plurality of designations are sensed to compel the corresponding members to be set in unison.

ALBERT W. MILLS.
FRANK J. FURMAN.
EDWARD J. RABENDA.